(12) United States Patent
Zhou (10) Patent No.: US 10,227,019 B2
(45) Date of Patent: Mar. 12, 2019

(54) VEHICLE DRIVING SYSTEM AND ENERGY CONTROL METHODS

(71) Applicant: General Electric Company, Schenectady, NY (US)

(72) Inventor: Jian Zhou, Shanghai (CN)

(*) Notice: Subject to any disclaimer, the term of this patent is extended or adjusted under 35 U.S.C. 154(b) by 233 days.

(21) Appl. No.: 14/995,936

(22) Filed: Jan. 14, 2016

(65) Prior Publication Data
US 2016/0200215 A1    Jul. 14, 2016

(30) Foreign Application Priority Data

Jan. 14, 2015  (CN) .......................... 2015 1 0019281

(51) Int. Cl.
*B60K 1/04*   (2006.01)
*B60L 11/18*  (2006.01)
*B60L 7/16*   (2006.01)

(52) U.S. Cl.
CPC ............ *B60L 11/1861* (2013.01); *B60K 1/04* (2013.01); *B60L 7/16* (2013.01); *B60L 11/1803* (2013.01); *B60L 11/1851* (2013.01); *B60L 11/1864* (2013.01); *B60L 11/1866* (2013.01); *B60L 11/1868* (2013.01); *B60L 2240/12* (2013.01); *B60L 2240/14* (2013.01); *B60L 2240/421* (2013.01); *B60L 2240/423* (2013.01); *B60L 2240/427* (2013.01); *B60L 2240/547* (2013.01); *Y02T 10/642* (2013.01); *Y02T 10/7005* (2013.01); *Y02T 10/7044* (2013.01); *Y02T 10/7061* (2013.01); *Y02T 10/7066* (2013.01); *Y02T 10/7258* (2013.01)

(58) Field of Classification Search
CPC .... B60L 11/1861; B60L 7/16; B60L 2240/12; B60K 1/04; Y02T 10/642

USPC .......................................................... 318/139
See application file for complete search history.

(56) References Cited

U.S. PATENT DOCUMENTS

| 6,230,496 | B1  | 5/2001  | Hofmann et al. |
| 7,595,597 | B2* | 9/2009  | King ........................ B60K 6/28 318/106 |
| 8,916,993 | B2* | 12/2014 | Berry .................... B60L 11/005 307/45 |

(Continued)

FOREIGN PATENT DOCUMENTS

| CN | 102963353 A | 3/2013 |
| CN | 103723050 A | 4/2014 |

OTHER PUBLICATIONS

Wong et al., "Parallel Configuration in Energy Management Control for the Fuel Cell-Battery-Ultracapacitor Hybrid Vehicles", IEEE Applied Power Electronics Colloquium (IAPEC), pp. 69-74, Apr. 2011.

(Continued)

*Primary Examiner* — Kawing Chan
(74) *Attorney, Agent, or Firm* — Meagher Emanuel Laks Goldberg & Liao, LLP (57) ABSTRACT

A vehicle propulsion system, comprising a DC-DC converter coupled to a DC link, a first and second energy storage devices coupled to the DC-DC converter, a DC-to-AC inverter coupled to the DC link, a motor coupled to the DC-to-AC inverter; and an energy management control system that generates a power split ratio between the first energy storage device and the second energy storage device based on operation conditions of the motor, a vehicle and a load.

18 Claims, 10 Drawing Sheets

(56) References Cited

U.S. PATENT DOCUMENTS

| | | | |
|---|---|---|---|
| 8,963,365 B2* | 2/2015 | King | B60L 11/1857 174/255 |
| 9,000,614 B2* | 4/2015 | King | B60L 11/005 307/45 |
| 9,290,107 B2* | 3/2016 | Shi | B60L 1/00 |
| 9,753,511 B2* | 9/2017 | Ye | G06F 1/263 |
| 9,800,182 B2* | 10/2017 | Zhou | H02P 4/00 |
| 2006/0152085 A1 | 7/2006 | Flett et al. | |
| 2007/0068714 A1 | 3/2007 | Bender | |
| 2007/0159007 A1* | 7/2007 | King | B60L 11/1864 307/71 |
| 2007/0164693 A1* | 7/2007 | King | B60K 6/28 318/109 |
| 2011/0100735 A1 | 5/2011 | Flett | |
| 2012/0038214 A1* | 2/2012 | King | B60L 11/005 307/77 |
| 2013/0106195 A1 | 5/2013 | Kusch et al. | |
| 2013/0138279 A1 | 5/2013 | Shi et al. | |
| 2013/0307489 A1 | 11/2013 | Kusch et al. | |
| 2014/0067183 A1* | 3/2014 | Sisk | B60L 11/1861 701/22 |
| 2014/0152225 A1* | 6/2014 | Zhou | H02P 4/00 318/500 |
| 2014/0375125 A1* | 12/2014 | Ye | H02J 3/24 307/26 |
| 2015/0149799 A1* | 5/2015 | Ye | G06F 1/263 713/320 |

OTHER PUBLICATIONS

Castro et al., "DC Link Control for Multiple Energy Sources in Electric Vehicles", Vehicle Power and Propulsion Conference (VPPC), pp. 1-6, Sep. 2011.

Long et al., "Energy Management and Control of Electric Vehicles, Using Hybrid Power Source in Regenerative Braking Operation", Energies, vol. No. 7, Issue No. 7, pp. 4300-4315, 2014.

Unofficial English translation of Office Action issued in connection with corresponding CN Application No. 201510019281 dated Sep. 29, 2017.

\* cited by examiner

VEHICLE DRIVING SYSTEM AND ENERGY CONTROL METHODS

TECHNICAL FIELD

Embodiments of the present invention relate to the vehicle field, and specifically relate to a vehicle propulsion system and energy control methods for the vehicle propulsion system.

BACKGROUND

Pure electric vehicle uses stored electrical energy to power the electric motor and drive the vehicle, and can also operate accessory drive. Pure electric vehicle may use one or a plurality of stored electrical energy sources. For example, the first source of stored electrical energy, e.g., energy of a battery to provide longer lasting energy while the second source of stored electrical energy, e.g., high-power battery to provide power and energy, e.g., for acceleration of the vehicle.

Hybrid electric vehicle can combine internal combustion engine and motor vehicle powered by the energy storage device (such as traction battery) to drive the vehicle. Such combination can be operated by the internal combustion engine and the electric motor run in their higher efficiency range to improve overall fuel efficiency. For example, the motor may have a higher efficiency when accelerating in standstill status, while the internal combustion engine can have higher efficiency during constant engine operation (such as highway driving). Making the improved initial acceleration of the motor allows the internal combustion engine of the hybrid vehicle smaller and more fuel efficient.

In battery-powered pure electric vehicles and plug-in hybrid electric vehicles, high energy density of the battery if the battery sizes reasonable configuration, then a charge to meet the mileage requirements. However, for high energy density batteries with the same size, they have a relatively lower energy density, and therefore they may not be able to meet the energy demand due to transient acceleration or hill climbing, especially in heavy-duty applications, such as city buses or trucks in particular. In view of this, multiple energy sources or mixing energy sources may be used to meet the demands of vehicle mileage and energy, without unduly increasing the size of a single high energy density battery. Heavy-duty electric vehicles may use high energy density battery and energy battery combinations as mixed energy sources, because such energy batteries with high power density and longer life. However, when introduce multiple energy sources or hybrid energy sources in the vehicle drive system, then the problems of how to achieve efficiently operation of the vehicle driving system by reasonable allocation of multiple energy sources or hybrid energy source and can respond to a variety of working conditions has become problems in this field.

Therefore, it is necessary to provide a system and method to solve at least one of the problems described above.

SUMMARY OF THE INVENTION

One aspect of embodiments of this invention is to provide a vehicle propulsion system, which includes DC-DC converter coupled to the DC bus, the first and second energy storage device coupled to the DC-DC converter, DC-AC inverter coupled to the DC bus, motor coupled to the DC-AC inverter and energy management control system. The energy management control system produces the energy allocation ratio between the first energy storage device and the second energy storage device based on the operation conditions of the electrical machine, vehicle and load.

The other aspect of embodiments of this invention is the offer of a method for energy management control, which includes obtaining the operation conditions of the electricity machine in vehicle propulsion system, and the vehicle propulsion system includes DC-DC converter coupled to the DC bus, the first and second energy storage devices coupled to the DC-DC converter, the DC-AC inverter coupled to the DC bus, and electricity machine of the DC-AC inverter coupled to the DC bus; obtaining the operation conditions of the vehicle; obtaining the operation conditions of the load; and producing the energy allocation ratio between first energy storage device and the second energy storage device is based on the operation conditions of the load.

According to the vehicle propulsion system and the energy management control system of this invention, we can control the energy allocation ratio between the first energy storage device and the second energy storage device based on the operation conditions of the electrical machine, vehicle and load to satisfy the vehicle propulsion energy requirements of the system, while making the vehicle propulsion system better able to work in a variety of driving conditions, such as starting, acceleration, cruising, braking and parking, and the vehicle propulsion system of this invention has higher efficiency and better robustness.

BRIEF DESCRIPTION OF THE DRAWINGS

When reading the following detailed description with reference to the attached Figures, these and other features, aspects, and advantages of the invention will become better to understand, in the Figures, the same element numerals used in the Figures denote the same parts:

FIG. 1 and FIG. 2 show a partial circuit diagram of the vehicle propulsion system;

DETAILED DESCRIPTION

To help technicians of this field exactly understand the subject matter of the claimed invention, the followings detailed description describes the specific execution modes of this invention with Figures. Under the detail description of these specific execution modes, this Description will not detail some common knowledge or constructions to avoid unnecessary details affecting the disclosure of this invention.

Unless otherwise defined and technical terms or scientific terms used in this Claims and Description should be the usual meanings understood by technicians of this field of the present invention with ordinary skills. In this Description and Claims, the "first" and "second" as well as similar words do not refer to any order, quantity, or importance, but rather used to distinguish the different components. "A" or "one" as well as other similar words does not mean quantitative restrictions, but indicates the presence of at least one. "Include" or "contain" as well as other similar words mean that an element or object before "include" or "contain" covers the illustrated element or object and equivalent element after "include" or "contain", it does not exclude other elements or objects. "Connect" or "involve" and other similar words are not limited to physical or mechanical connections, but may include electrical connections, whether direct or indirect.

Figure 1:
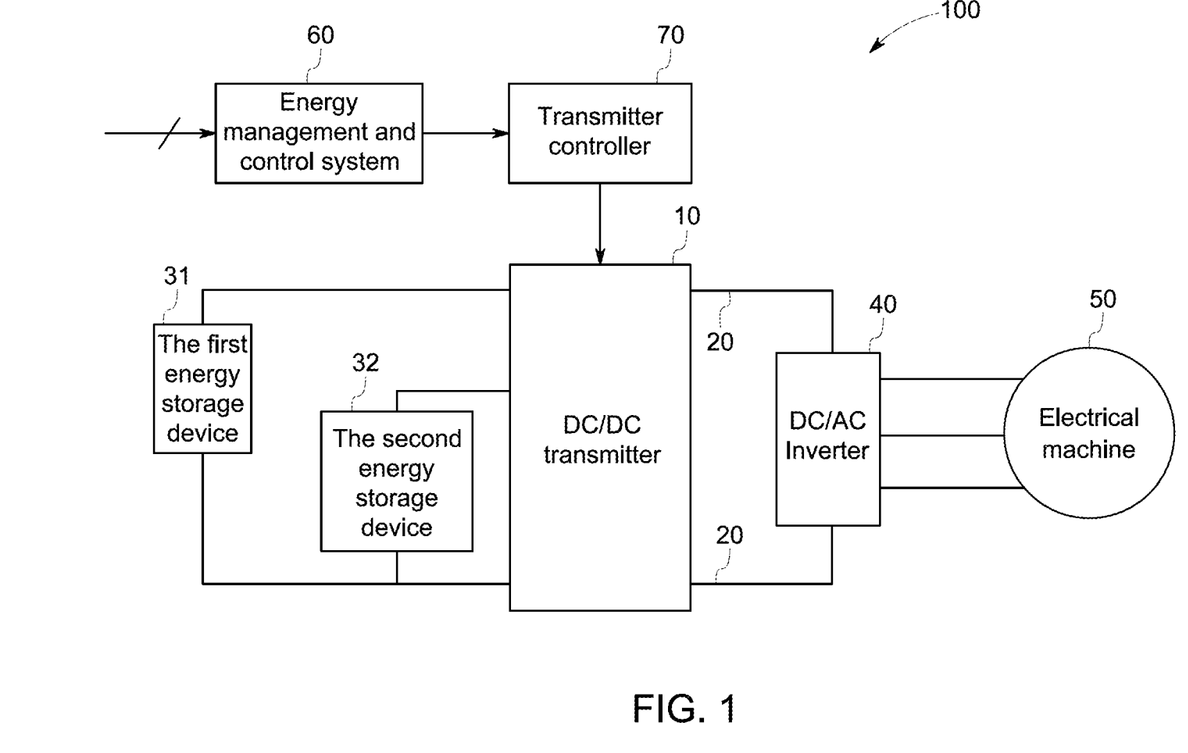
FIG. 1 is a schematic block diagram of the specific execution mode for vehicle propulsion system as per embodiments of this invention.
Figure 7:
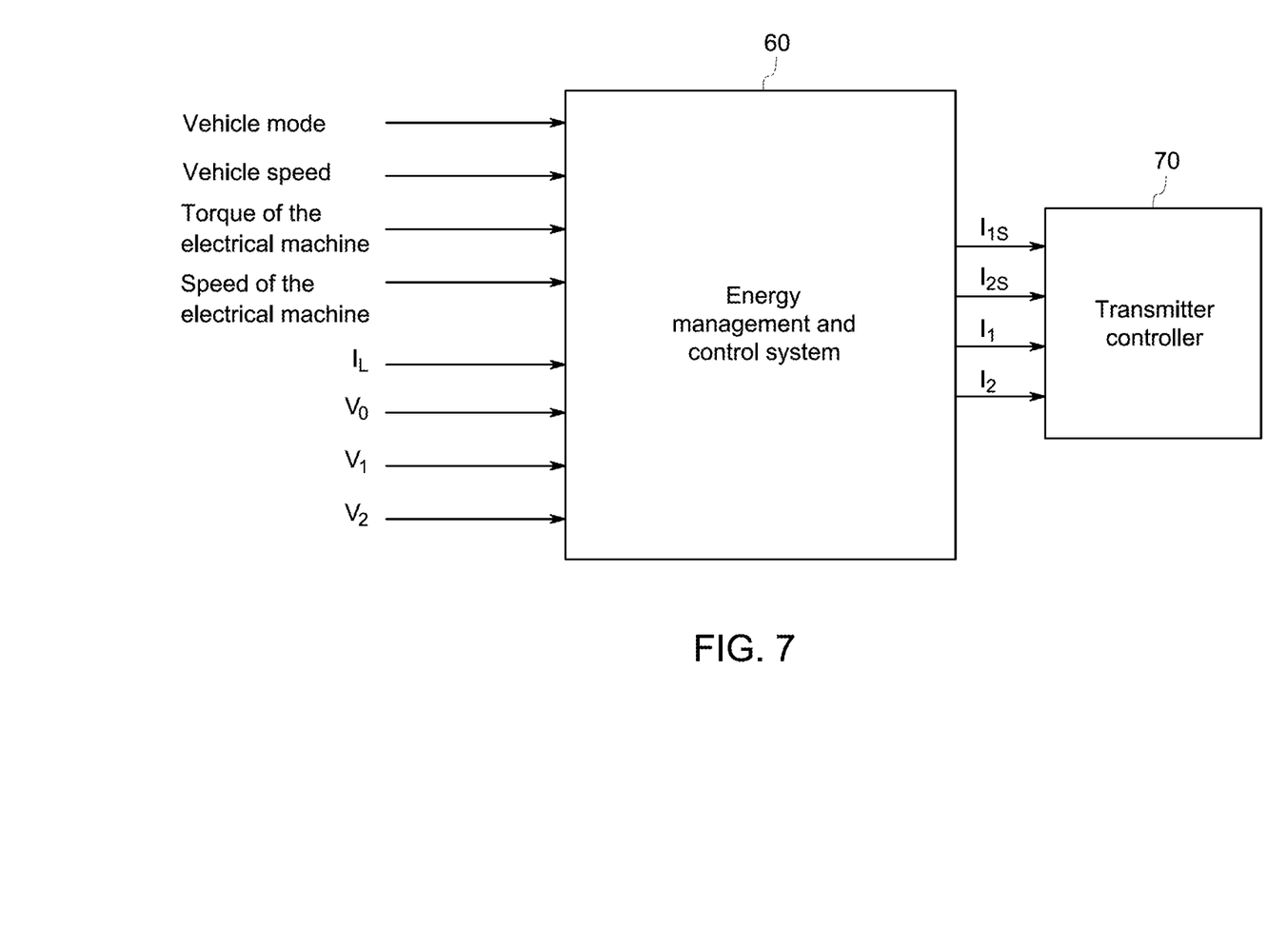
FIG. 7 is a schematic block diagram of the energy management control system and the converter controller in FIG. 1.
Figure 8:
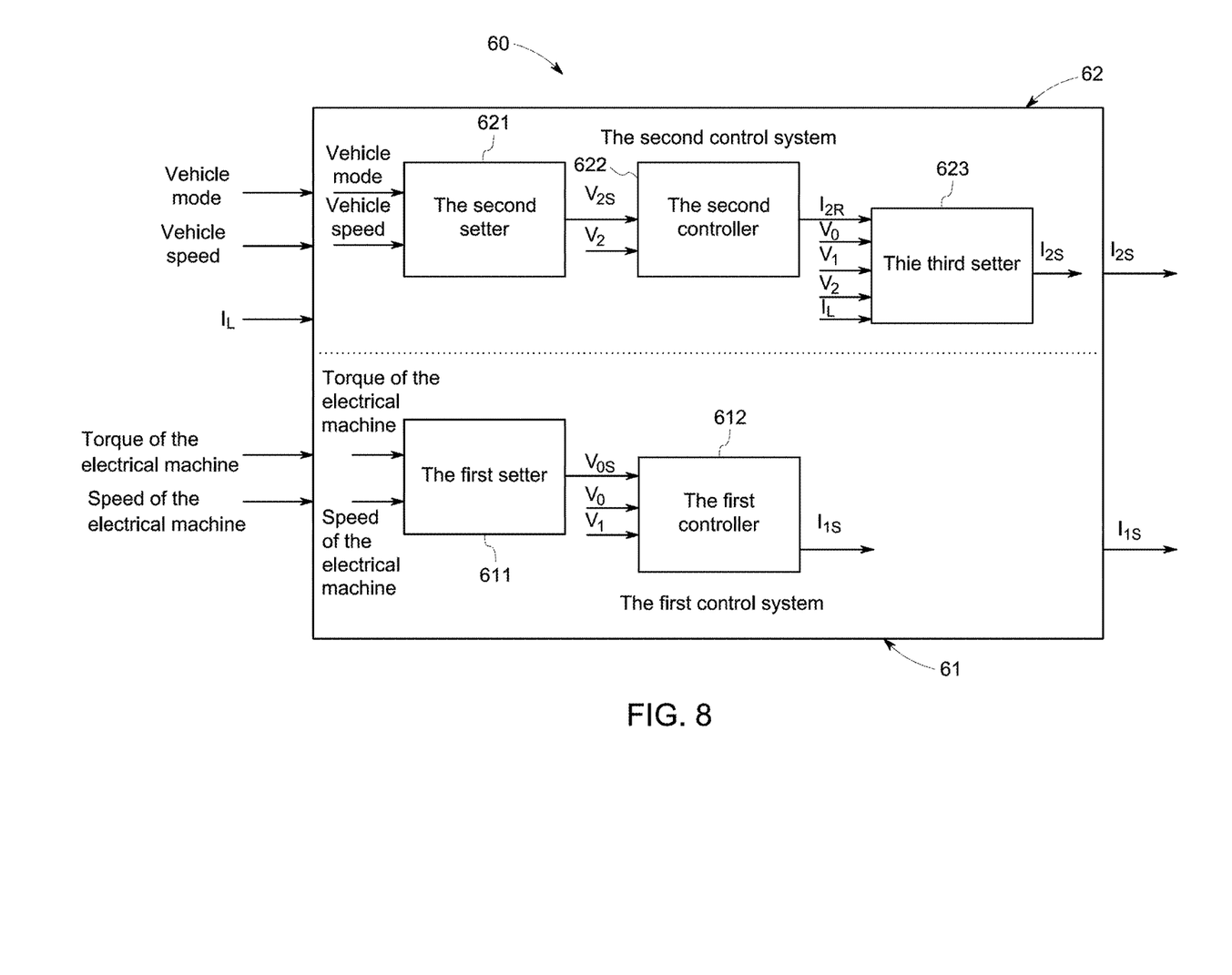
FIG. 8 is a schematic block diagram of the specific execution mode for the energy management control system as per this invention.

FIG. 1 is a schematic block diagram of an execution mode for the vehicle propulsion system as per embodiments of this invention. Referring to FIG. 1, the specific execution mode for vehicle propulsion system 100 as per embodiments of this invention may be applied to a pure electric vehicle or hybrid electric vehicle, which includes the positive and negative terminal of DC-DC (DC/DC) converter 10 coupled to the DC bus (DC Link), the first energy storage device 31 and the second energy storage device 32 coupled to the DC-DC converter 10, the positive terminal 20 and negative terminal of DC-AC (DC/AC) inverter 40 coupled to DC bus 20 electrical machine 50 and energy management control system 60 coupled to DC-AC inverter 40. The load includes DC-AC inverter 40 and electrical machine 50. Energy management control system 60 produces the energy allocation ratio between the first energy storage device 31 and the second energy storage device 32 based on the operation conditions of electrical machine 50, vehicle and load. Under a specific execution mode, the operation conditions of electrical machine 50 includes torque and speed of electrical machine 50, the operation conditions of the vehicle includes the mode and speed of the vehicle, the operation conditions of the load includes the loaded electricity input to DC-AC inverter $I_L$ 40 (as shown in FIG. 7 and FIG. 8).

The vehicle propulsion system 100 also includes transverse controller 70, and converter controller 70 controls DC-AC converter based on the energy allocation ratio between the first energy storage device 31 and the second energy storage device 32 to control DC-DC converter 10.

For the vehicle propulsion system 100 of an embodiment of this invention, the energy management control system 60 can control the energy allocation ratio between the first energy storage device 31 and the second energy storage device 32 based on the operation conditions of electrical machine 50, vehicle and load to satisfy the vehicle driving energy requirements of the vehicle propulsion system 100, while making the vehicle propulsion system 100 be better able to work in a variety of driving conditions, vehicle driving system 100 of this invention has higher efficiency and better robustness.

The first energy storage device 31 and the second energy storage device 32 each may include one or more energy storage units. Under a specific execution mode, the first energy storage device 31 may be a high energy density energy battery. Under a specific execution mode, the second energy storage device 32 may be a high power density energy battery. Under the other specific execution mode, the second energy storage device 32 may be super capacitor, super capacitor includes multiple capacitor units coupled to each other. From the specific execution modes and Figures of this invention, the second energy storage device 32 may be shown schematically as super capacitor.

Figure 2:
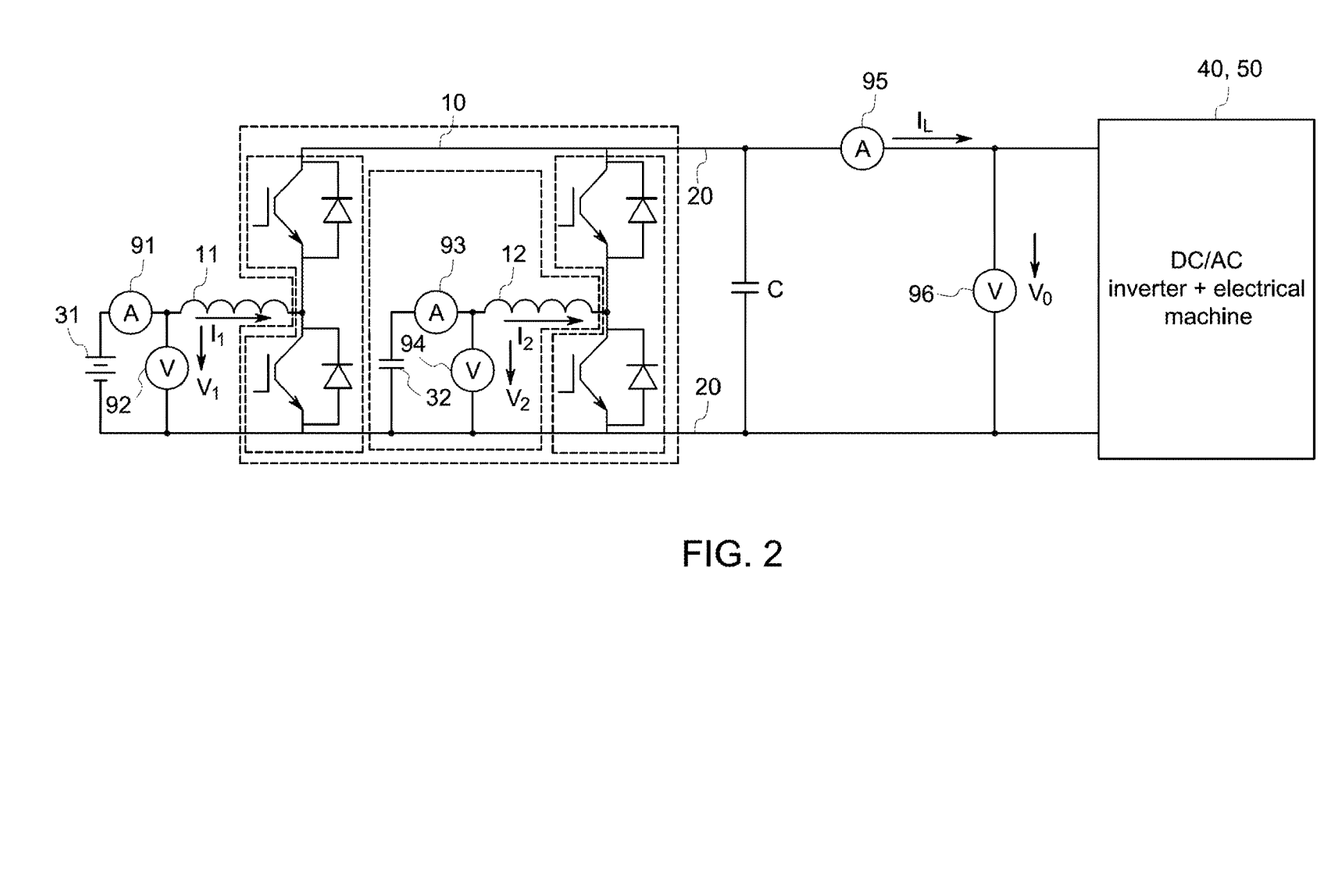

As shown in FIG. 2, DC-DC converter 10 comprises the first DC-DC converter 11 coupled to the first energy storage device 31 and the second energy storage device 32, and the second DC-DC converter 12 coupled to the second energy storage device, further, the output of the first DC-DC converter 11 and the second DC-DC converter 12 are connected together. Under a specific execution mode, the first DC-DC converter 11 and the second DC-DC converter 12 can be integrated in a DC-DC converter 10 with two input channels, and the first energy storage device 31 coupled to DC bus 20 through one input channel of DC-DC converter 10, and the second energy storage device 32 coupled to DC bus 20 through the other input channel of DC-DC converter 10. Under the other specific execution mode, the first DC-DC converter 11 and the second DC-DC converter 12 can be respectively independent converters, the first energy storage device 31 and the second energy storage device 32 couple to DC bus through each separate converter 20.

As shown in FIG. 2, under this specific execution mode, the vehicle propulsion system 100 is also set with ammeter 91, 93, 95 and voltmeter 92, 94 and 96. Ammeter 91 is for measuring the electricity of the first energy storage device 31 $I_1$, voltmeter 92 is for measuring the voltage of the first energy storage device 31 $V_1$, ammeter 93 is for measuring the second electricity of the second energy storage device 32 $I_2$, voltmeter 94 is for measure the voltage of the second energy storage device 32 $V_2$, ammeter 95 is for measuring the electricity of the load $I_L$, voltmeter 96 is for measuring the voltage of DC bus 20 $V_0$. Although in the Description and Figures of this invention, the first electricity of the first energy storage device 31 $I_1$ and the voltage $V_1$, the second electricity of the second energy storage device 32 $I_2$ and the voltage $V_2$, the load electricity $I_L$ and the voltage of DC bus 20 $V_0$ are obtained in direct measurement by amperemeter 91, 93, 95 and voltmeter 92, 94 and 96 set in the vehicle propulsion system 100, however, this invention is not limited to this, under other specific execution modes in this invention, the first electricity of the first energy storage device 31 $I_1$ and the voltage $V_1$, the second electricity of the second energy storage device 32 $I_2$ and voltage $V_2$, the load voltage $I_L$ and the voltage of DC bus 20 $V_0$ may also be obtained by other methods. In addition, the word "obtain" is a broad concept that includes obtaining directly by the vehicle propulsion system 100, and it may also include obtaining passively by the vehicle propulsion system 100, i.e., obtaining by other devices outside the vehicle propulsion system 100, and then transferring to the vehicle propulsion system 100.

Further, the electricity and voltage direction in FIG. 2 are only schematically illustrated, the direction of the first electricity $I_1$ and the direction of the voltage $V_1$ of the first energy storage device 31, the direction of the second electricity $I_1$ and the direction of voltage $V_2$ of the second energy storage device 32, the direction of the load electricity $I_L$ and the direction of the voltage of DC bus 20 $V_0$ will change with the difference in driving modes of the vehicle propulsion system model 100.

Figure 3:
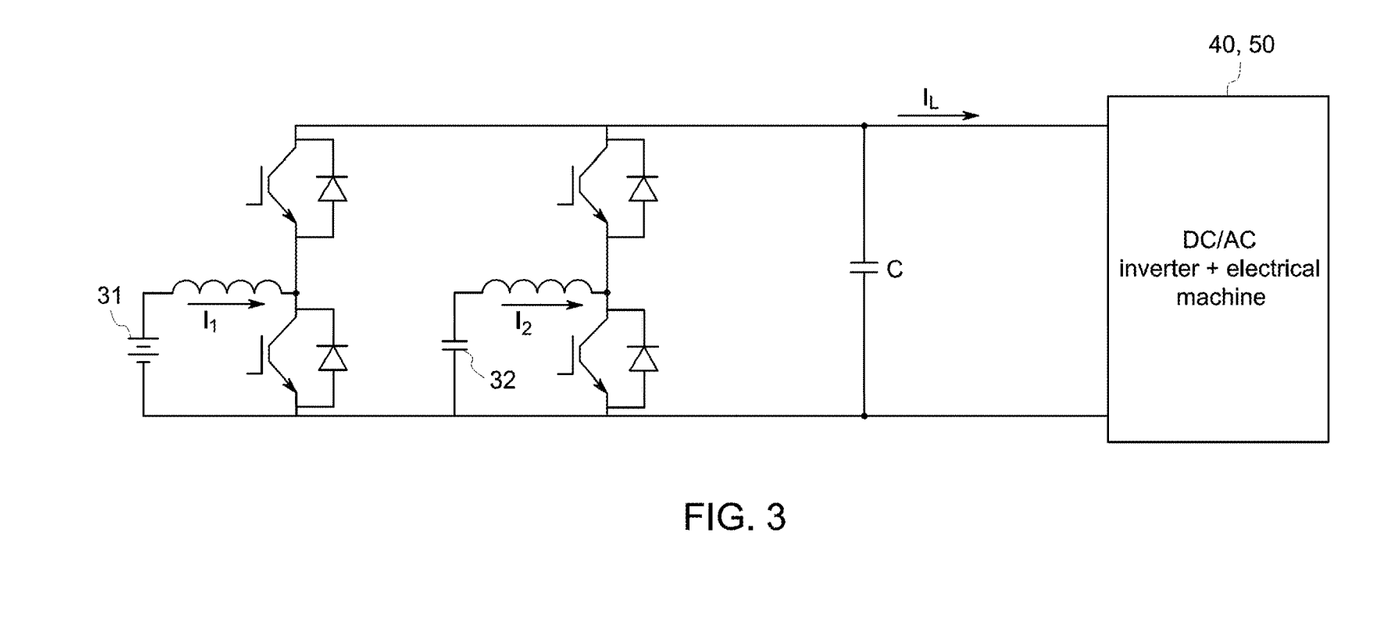
FIG. 3 schematically shows the drawing of electricity flow of the vehicle driving system at acceleration or cruising driving mode.

For example, FIG. 3 schematically shows the drawing of electricity flows of the vehicle propulsion system 100 in acceleration or cruising driving modes, as shown in FIG. 3, this time, the first electricity of the first energy storage device 31 $I_1$ flows out from the first energy storage device 31, therefore, the first energy storage device 31 is in discharge state; the second electricity of the second energy storage device 32 $I_2$ also flows out from the second energy storage device 32, therefore, the second energy storage device 32 is also in discharged state, the load electricity $I_L$ flows to the load, the first energy storage device 31 and the second energy storage device 32 together provide energy to the load.

Figure 4:
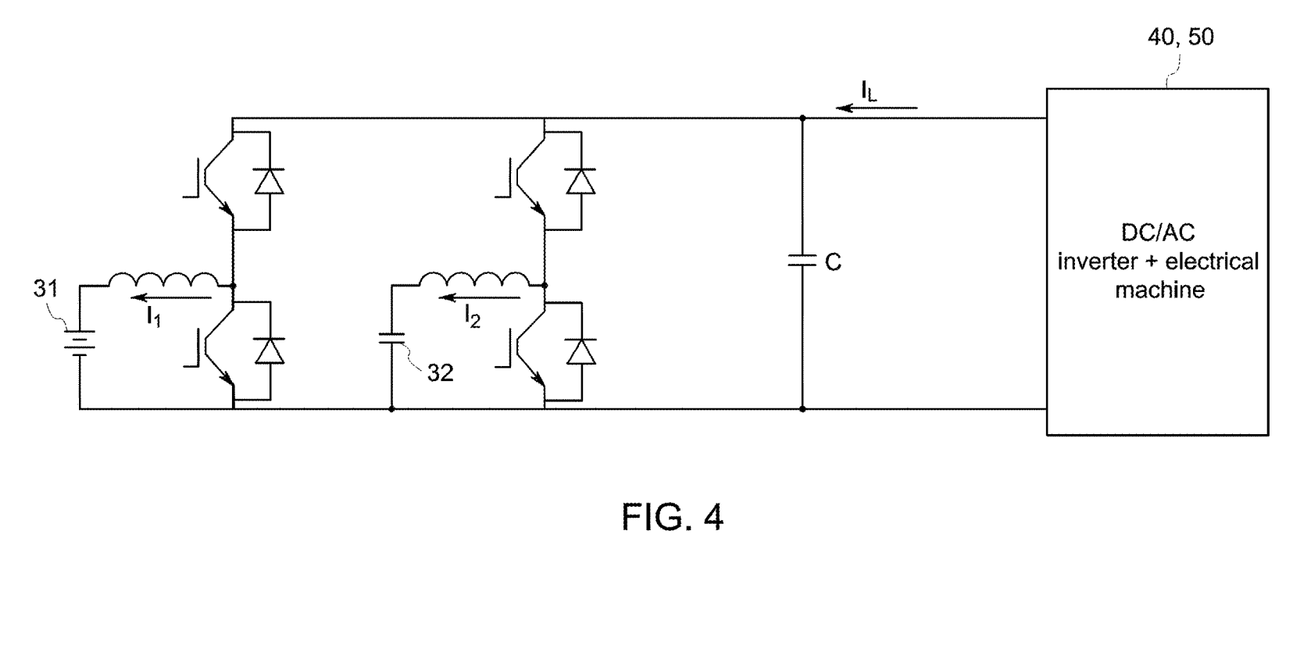
FIG. 4 schematically shows the drawing of electricity flow of the vehicle propulsion system at braking driving mode.

FIG. 4 schematically shows the drawing of electricity flows of the vehicle propulsion system 100 in braking mode, as shown in FIG. 4, at this time, the first electricity of the first energy storage device 31 $I_1$ flows to the first energy storage devices 31, therefore, the first energy storage devices 31 is in charged state; the second electricity of the second energy storage device 32 $I_2$ also flows to the second energy storage devices 32, therefore, the second energy storage devices 32 is also in charge state, the load electricity $I_L$ flows from the load, the first energy storage device 31 and the second energy storage devices 32 recycle together due to the energy from the load.

Figure 5:
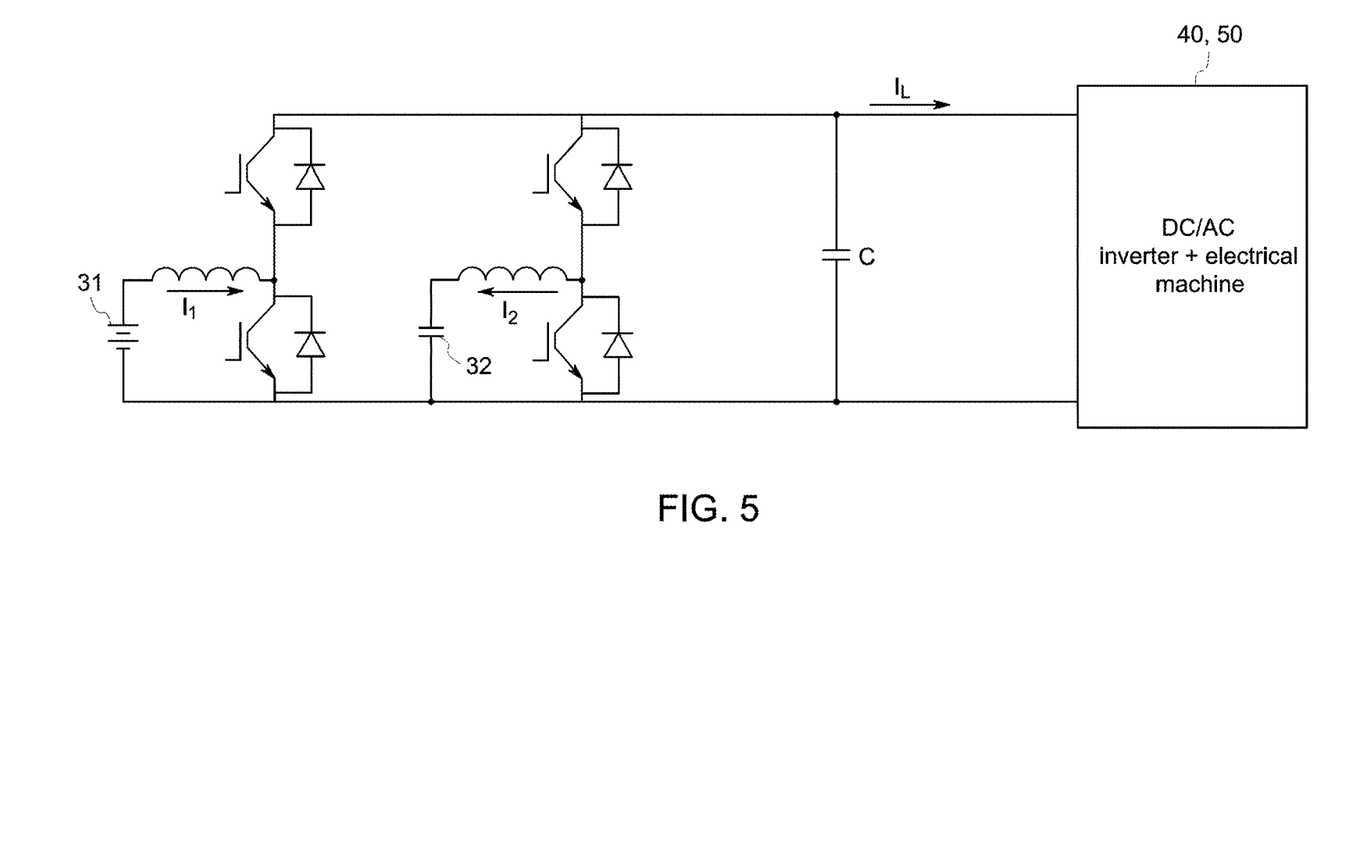
FIG. 5 schematically shows the drawing of electricity flow of the vehicle propulsion system at cruising driving mode.

FIG. 5 schematically shows the drawing of the electricity flow directions of the vehicle propulsion system in cruise mode, shown in FIG. 5, at this time, the first electricity of the first energy storage device 31 $I_1$ flows out from the first energy storage device 31, therefore, the first energy storage devices 31 is in discharged state, and the second electricity of the second energy storage device 32 $I_2$ flows to the second energy storage devices 32, therefore, the energy storage device 32 is in charging state, electricity load $I_L$ flows to the load, the first energy storage device 31 provides energy to the second energy storage device 32 and the load.

Figure 6:
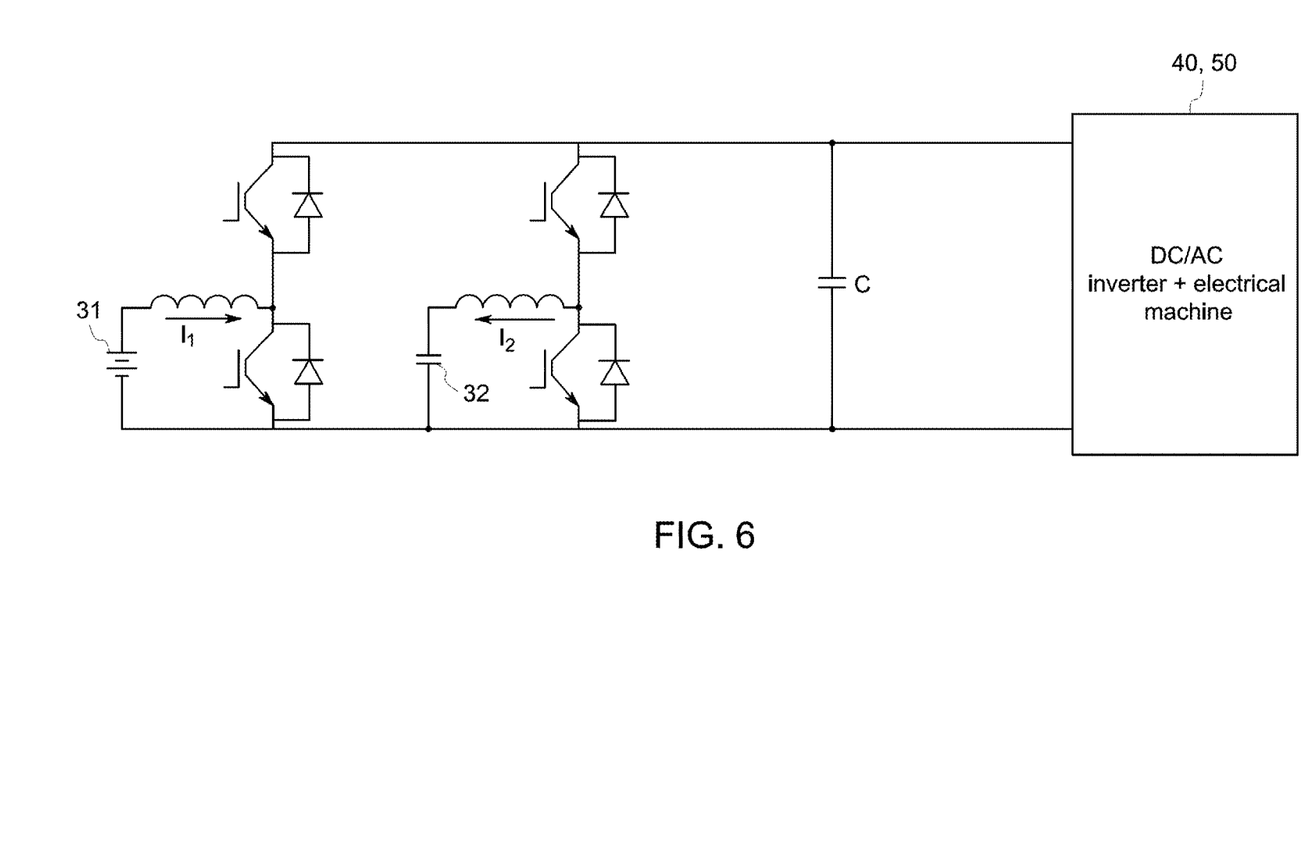
FIG. 6 schematically shows the drawing of electricity flow of the vehicle propulsion system at starting driving mode.

FIG. 6 schematically shows the drawing electricity flow directions of the vehicle propulsion system in starting mode, as shown in FIG. 6, at this time, the first electricity of the first energy storage device 31 $I_1$ flows out from the first energy storage device 31, therefore, the first energy storage devices 31 is in discharged state, and the second electricity of the second energy storage device 32 $I_2$ flows to the second energy storage devices 32, therefore, the energy storage device 32 is in charging state, no load electricity $I_L$, in this case, the first energy storage device 31 only provides energy to the second energy storage device 32.

FIG. 7 shows the schematic block diagram of energy management control system 60 and converter controller 70 in FIG. 1, and FIG. 8 shows the schematic block diagram of the energy management control system according to a specific execution mode of this invention. In conjunction with FIGS. 7 and 8, energy management control system 60 includes the first control system 61 and the second control system 62. The first control system 50 of 61 produces the first set electricity of the first energy storage device 31 based on the torque and speed of electrical machine 50 $L_{1S}$. Further, in a specific execution mode, the first control system 61 produces the first set electricity of the first energy storage device 31 $V_1$ based on the torque and speed of electrical machine 50 and also based on the voltage of DC bus voltage 20 $V_0$ and the first energy storage device 31 of $I_{1S}$. In a specific execution mode, the first control system 61 includes the first setter 611 and the first controller 612, the first setter 611 produces the set voltage $V_{0S}$ of DC bus 20 based on the torque and speed of the electrical machine, the first setter 612 produces the first set electricity $V_{0S}$ of the first energy storage device 31 based on the set voltage $V_0$ of DC bus 20 and the voltage $V_1$ of DC bus 20 and the voltage $I_{1S}$ of the first energy storage device 31. The first controller 612 adjusts the voltage of DC bus 20 through the first energy storage device 31, i.e., the input channel of energy battery $V_0$, since the first energy storage device 31, i.e. the voltage of the energy battery has smaller fluctuation with respect to the second energy storage devices 32, i.e., the super-capacitor, therefore it may less disturbed the voltage of DC bus 20 $V_0$, thus, making the vehicle propulsion system 100 has better control performance and higher system efficiency of the DC bus voltage. Also, it will not abuse the second energy storage device 32, i.e., the super-capacitor power intended for peak energy processing.

Continue to combine FIGS. 7 and 8, the second control system 62 produces the second set electricity of the second energy storage device 32 $I_L$ based on the mode and speed of the vehicle and load electricity $I_{2S}$. Further, in a specific execution mode, the second control system 62 produces the second set electricity of the second energy storage device 32 $I_L$ based on the mode and speed of the vehicle and the load electricity $V_0$ and also based on the voltage of DC bus 20 $V_1$, the voltage of the first energy storage device 31 $V_2$ and the voltage of the second energy storage device 32 $I_{2S}$. In a specific execution mode, the second control system 62 includes the second setter 621, the second setter 621 produces the second set voltage of the second energy storage device 32 based on the mode and speed of the vehicle. $V_{2S}$.

The followings will combine the mode and speed of the vehicle to detail describe the way of the second set 621 producing the second set voltage of the second energy storage device 32 $V_{2S}$.

When the vehicle is running in cruising mode, it means that the speed of the vehicle is basically stable at a constant value, in this case, the second setter 621 can produce the second set voltage of the second energy storage device 32 based on the current cruising speed of the vehicle and through the required energy of the second energy storage device 32 in vehicle acceleration and the required energy of the second energy storage device 32 in vehicle regenerative braking $V_{2S}$.

For example, in this execution mode, with the current cruising speed of the vehicle$v_{cruise}$, based on conservation of energy, the following equation can calculate the required energy of the second energy storage device 32 when the vehicle accelerating to the maximum speed $v_{max}$ (in this specific execution mode, the second energy storage device 32 is super capacitor 32):

$$U_{cs\_acc}^2 = U_{cmin}^2 + \frac{m}{c}(v_{max}^2 - v_{cruise}^2) \qquad (1)$$

is for the vehicle to accelerate to the maximum speed $U_{cs\_acc}$ and the voltage both ends of super capacitor 32 should contain, $v_{max}$ is the minimum voltage both ends of super capacitor 32, $U_{cmin}$ s the capacitor of super capacitor 32, as well as the quality of Cm the vehicle.

With the current cruising speed of the vehicle $v_{cruise}$, based on conservation of energy, the following equation can calculate the required storage energy of the second energy storage device 32 when the vehicle decelerating to the minimum speed $v_{min}$:

$$U_{cs\_reg}^2 = U_{cmax}^2 - \frac{m}{c}(v_{cruise}^2 - v_{min}^2) \qquad (2)$$

is for the vehicle $U_{cs\_reg}$ to decelerate to the minimum speed $v_{min}$ and the voltage both ends of super capacitor 32 should contain, and $U_{cmax}$ is the maximum voltage of super capacitor 32.

We can use minimal logic to combine with the two energies calculated in equation (1) and equation (2), as shown in the following formula:

$$U^2_{cs} = \min(U^2_{cs\_acc}, U^2_{cs\_reg}) \quad (3)$$

Thus, we can obtain the voltage at both ends of the super capacitor after combination $U_{cs}$, and the second set voltage of the second energy storage device 23 $V_{2S}$ is the voltage at both ends of the super capacitor after combination $U_{cs}$. Therefore, we can obtain the second set voltage of the second energy storage device 32 when the vehicle is running in cruising mode by equation (1) to (3) $V_{2S}$.

When the vehicle is running in starting or acceleration mode, the vehicle propulsion system 100 will experience a larger transient, which may result in noisy vehicle speed measurement. If the second setter 621 directly using the original sped signal of the vehicle $v_{raw}$ to set the second set voltage of the second energy storage device 32 $V_{2S}$, it will make the controller of the second energy storage device 32, i.e., super capacitor to frequently operate. In order to reduce the energy consumed by the super capacitor controller, the original speed signals of the vehicle $v_{raw}$ can be appropriately converted.

Figure 9:
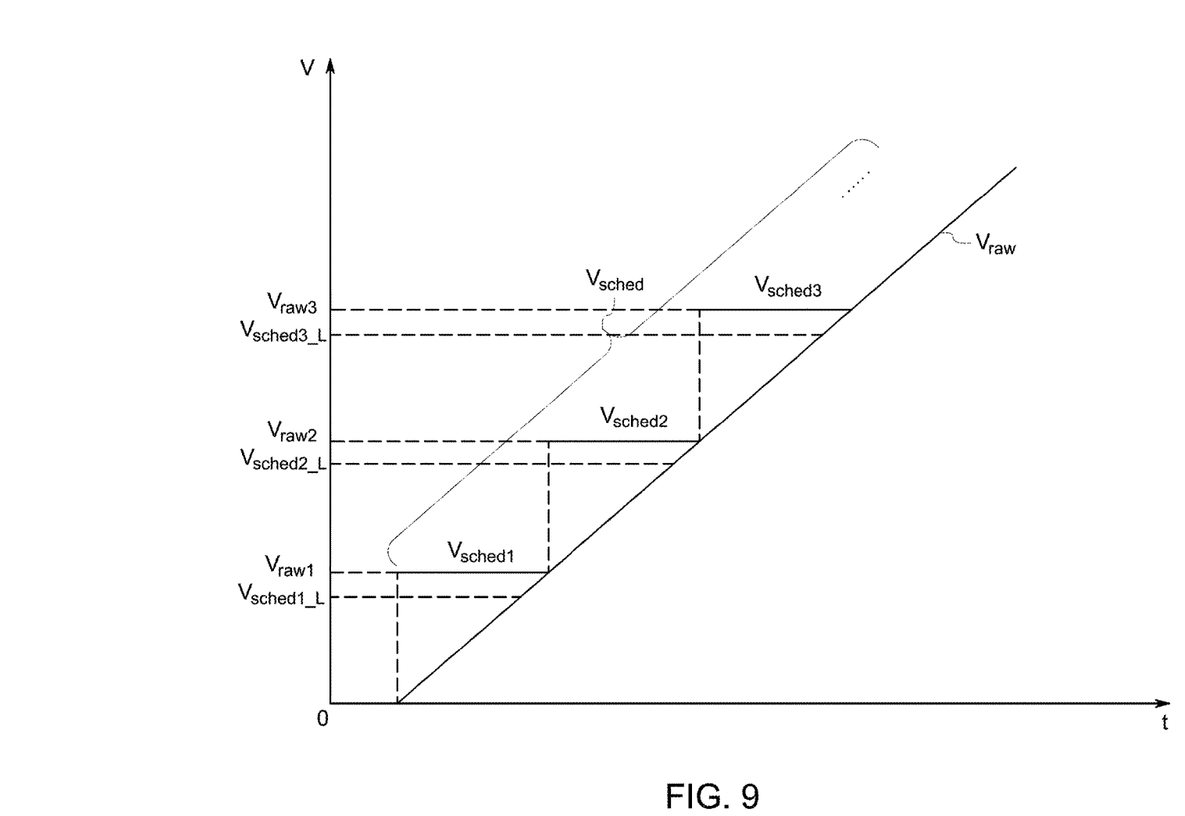
FIG. 9 is a schematic block diagram of transferring the original speed of the vehicle to the set speed of the vehicle.

For example, in this execution mode, when the vehicle is running in starting or accelerating mode, then the second setter 621 will convert the original speed signal $v_{raw}$ of the vehicle to the set speed of the vehicle $v_{sched}$. For example, referring to FIG. 9, when the vehicle starts from standstill, it can convert the original speed signals of the vehicle from 0 to $v_{raw1}$ to the set speed of the vehicle $v_{sched1}$, $v_{sched1}=v_{raw1}$; when the speed continues to increase by more than $v_{sched1}$, the original speed signals of the vehicle can be converted from $v_{raw1}$ to $v_{raw2}$ to the original set speed of the vehicle $v_{sched2}$, $v_{sched2}=v_{raw2}$; when the vehicle speed continues to increase over $v_{sched2}$, the original speed signals of the vehicle can be converted from $v_{raw2}$ to $v_{raw3}$ to the original set speed of the vehicle $v_{sched3}$, $v_{sched3}=v_{raw3}$, and so on . . . . However, considering the vehicle speed may be largely changed near set speed $v_{sched1}$, $v_{sched2}$, $v_{sched3}$ and so on, in order to avoid output speed value frequent switching between $v_{sched1}$ and $v_{sched2}$, $v_{sched2}$ and $v_{sched3}$, $v_{sched3}$ and the next set speed, therefore, for the set speed $v_{sched1}$, $v_{sched2}$, $v_{sched3}$ and so on corresponding to the lower limit set speed $v_{sched1\_L}$, $v_{sched2\_L}$, $v_{sched3\_L}$ and so on. For example, when the vehicle speed experiences a large transient near $v_{sched1}$, in order to avoid frequent switching of output speed value between $v_{sched1}$ and $v_{sched2}$, set lower limit speed $v_{sched1\_L}$, only when the speed drops to $v_{sched1\_L}$ or less, then the output speed switches from $v_{sched2}$ to $v_{sched1}$, and so on . . . . Thus, the original speed signals of the vehicle $v_{raw}$ converts to the set speed of the vehicle $v_{sched}$. In a specific execution mode, the lookup table LUT can be pre-set in the second setter 621, as shown in the following formula; we can convert the original speed signals LUT of the vehicle to the set speed of the vehicle $v_{raw}$ through the search of lookup table $v_{sched}$.

$$v_{sched}=\text{LUT}(v_{raw}) \quad (4)$$

Lookup table LUT has two functions: first, avoid the output bounce between two adjacent lookup value; second, predict the possible speed changes enabled the controller of the super capacitor has better dynamic performance.

Then, based on the set speed of the conversion vehicle $v_{sched}$, based on conservation of energy, can be calculated by the following equation super voltage across the capacitor $U_{cs}$, the second set voltage of the second energy storage devices 32 is $V_{2S}$ is the voltage across the capacitor super $U_{cs}$.

$$U^2_{cs} = U^2_{cmin} + \frac{m}{c}(v^2_{max} - v^2_{sched}) \quad (5)$$

Therefore, we can obtain the second set voltage of the second energy storage device 32 when the vehicle is running in starting or accelerating mode by equation (4) to (5) $V_{2S}$.

When the vehicle is running in braking mode, in this specific execution mode, the second set voltage $V_{2S}$ of the second energy storage device 32 is set as constant value.

The second control system 62 further includes the second controller 622, and the third setter 623, the second controller 622 produces the required electricity $V_{2S}$ of the second energy storage device 32 based on the produced second set voltage $V_2$ of the second energy storage device 32 and the voltage $I_{2R}$ of the second energy storage device 32.

The third setter 623 predetermines the rated electricity of the first energy storage device 31 based on the obtainable measuring result of FIG. 8 $I_{1N}$. The rated electricity $I_{1N}$ of the first energy storage device 31 may be a constant value of the first energy storage device 32 defined by the manufacturer, e.g., to achieve good life of the first energy storage device 31, battery manufacturers typically recommend to discharge in 1C (1 times of battery discharge rate) or lower rate. However, we can also use life model of the first energy storage device 31 and take into account a variety of operating condition and use more complex algorithms to advance establish lookup table, the rated electricity $I_{1N}$ of the first energy storage device 31 can be obtained based on the measuring result of FIG. 8. By the lookup table.

The third setter 623 produces the second set electricity $I_{2R}$ of the second energy storage device 32 based on the second required electricity $I_L$ of the second energy storage device 32, the load electricity $V_0$, the voltage of DC bus 20 $V_1$, the voltage $V_2$ of the first energy storage device 31, the voltage $I_{1N}$ of the second energy storage device 31 and the rated electricity $I_{2S}$ of the first energy storage device 32.

While there is no apparent connection between the third setter 623 of the second control system 62 and the first controller 612 of the first control system 61 in FIG. 8, however, by static set the rated electricity $I_{1N}$ of the first energy storage device 31 and feedback the control and actually connect the third setter 623 of the second control system 62 and the first controller 612 of the first control system 61.

As shown in FIG. 7, converter controller 70 receives the first set electricity $I_{1S}$ of the first energy storage device 31, the second set electricity Its of the second energy storage device 32, the first electricity $I_1$ of the first energy storage and the second electricity $I_2$ of the second energy storage devices 32, and control DC-DC converter 10 based on these electricity.

Figure 10:
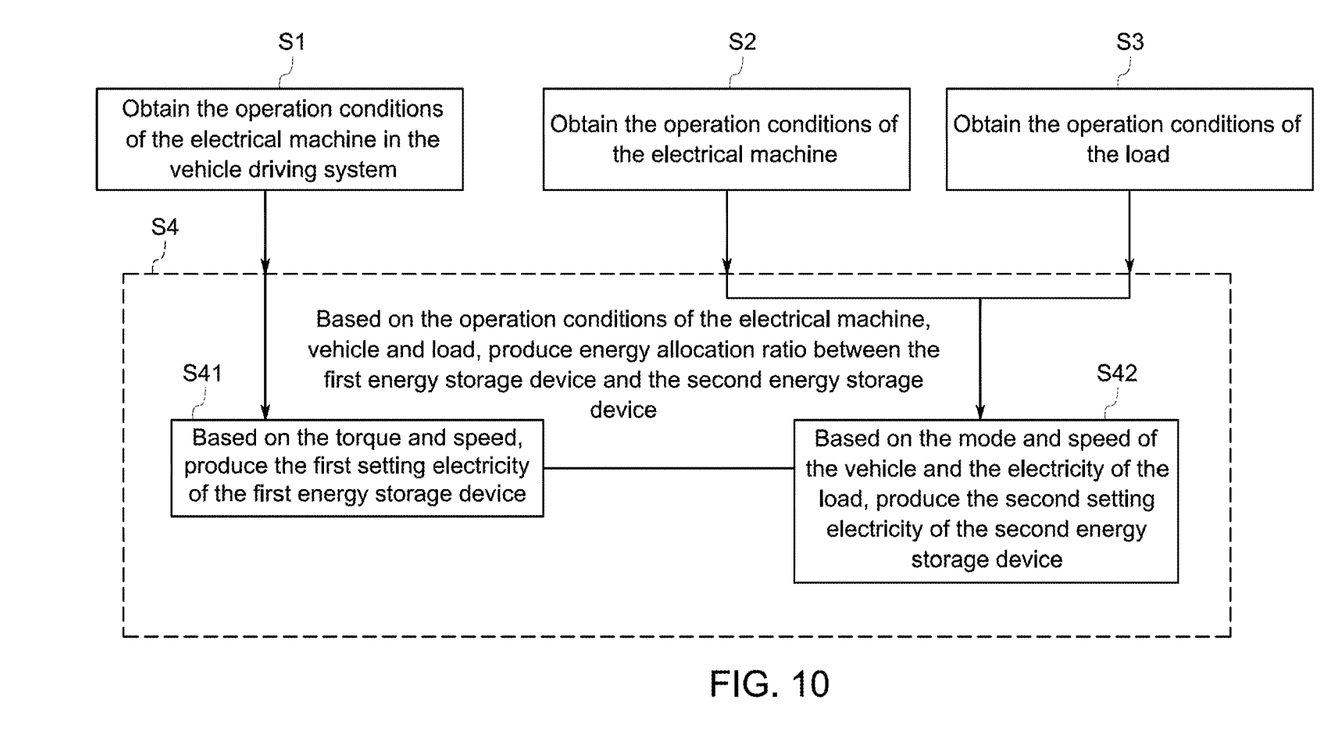
FIG. 10 is a flow diagram of the specific execution mode for applying the energy management control system of the vehicle propulsion system in FIG. 1 according to embodiments of this invention.

FIG. 10 shows the flowchart used in the above-mentioned energy management control method for the vehicle propulsion system 100. As shown in FIG. 10, the energy management control method according to a specific execution mode of this invention comprises the steps of: In step S1, obtain the operation conditions of electrical machine 50 in the vehicle propulsion system 100. In a specific execution mode, the operation conditions of electrical machine 50 include the torque and the speed of electrical machine 50. In step S2, obtain the operational conditions of the vehicle. In a specific execution mode, the operation conditions of the vehicle include the mode and speed of the vehicle. In step S3, obtain the operational conditions of the load. In a specific execution mode, the operation conditions of the load include the load electricity $I_L$ input to DC-AC inverter 40. In step S4, produce the energy allocation ratio between the first energy storage device 31 and the second energy storage device 32 based on the operation conditions of electrical machine 50, vehicle and load.

Further, step S4 comprises the steps of: In step S41, it produces the first set electricity $I_{1S}$ of the first energy storage device 31 based on the torque and speed of electrical machine 50. In a specific execution mode, the energy management control method further includes the obtaining of the voltage $V_0$ of DC bus 20 and the voltage $V_1$ of the first energy storage device 31, then in step S41, it produces the first set electricity $V_1$ of the first energy storage device 31 based on the torque and speed of electrical machine 50 and also based on the voltage $V_0$ of the first energy storage device 31 to produce the first set circuit $I_{1S}$ of the first energy storage device 31.

In a specific execution mode, step S41 further comprises the steps of: produce the set electricity of DC bus 20 based on the torque and speed of electrical machine 50 $V_{0S}$ and produce the first set electricity $V_{0S}$ of the first energy storage device 31 based on the set voltage $V_0$ of DC bus 20, the voltage $V_1$ of DC bus 20, and the voltage $I_{1S}$ of the first energy storage device 31. In step S42, produce the second set electricity $I_L$ of the second energy storage device 32 based on the mode and speed of the vehicle and the load electricity $I_{2S}$.

In a specific execution mode, the energy management control method further comprises obtaining the voltage $V_2$ of the second energy storage device 32, then step S42 further comprises the steps of: produce the second set voltage $V_{2S}$ of the second energy storage devices 32 based on the mode and speed of the vehicle.

When the vehicle is running in cruising mode, in a specific execution mode, step S42 further includes the steps of: calculate the required energy for the second energy storage device 32 when the vehicle is in acceleration. For example, in a specific execution mode, according to the above equation (1), with the cruising speed of the vehicle $v_{cruise}$, calculate the required energy for the second energy storage device 32 when the vehicle accelerates to the maximum speed $v_{max}$.

Step S42 then further includes the steps of: calculate the required storage energy of the second energy storage device 32 when the vehicle is in regenerative braking. For example, in a specific execution mode, according to the above equation (2), with the cruising speed $v_{cruise}$ of the vehicle, calculate the required energy for the the second energy storage device 32 when the vehicle decelerates to the minimum speed $v_{min}$.

Step S42 then further includes the steps of: on the basis of the previous two calculated energies, produce the second set voltage $V_{2S}$ of the second energy storage device 32. For example, in a specific execution mode, according to the above equation (3), combine the two energies calculated to obtain the second setting voltage $V_{2S}$ of the second energy storage device 32 when the vehicle is running in cruising mode.

When the vehicle is running in starting or acceleration mode, in a specific execution mode, step S42 further includes the steps of: according to the above equation (4), through the review of pre-set look-up table LUT, convert the original vehicle speed signals $v_{raw}$ to the set speed of the vehicle $v_{sched}$.

Step S42 then further includes the steps of: based on the conversion set vehicle speed $v_{sched}$, according to equation (5) to produce the second set voltage $V_{2S}$ of the second energy storage device 32.

When the vehicle is running in braking mode, in a specific execution mode, then step S42 includes setting the second set voltage $V_{2S}$ of the second energy storage device 32 as a constant.

Step S42 then further includes the steps of: produce the second electricity $V_{2S}$ of the second energy storage device 32 based on the second set voltage $V_2$ of the second energy storage device 32 and the voltage $I_{2R}$ of the second energy storage devices 32, voltage 32 needs to predetermine the rated electricity of the first energy storage device 31 $I_{1N}$. The rated electricity $I_{1N}$ of the first energy storage device 31 can be a constant value; or the rated electricity $I_{1N}$ of the first energy storage device 31 can be obtained by reviewing the pre-set look-up table based on the measuring results of FIG. 8.

Step S42 then further includes the steps of: produce the second set electricity $I_{2R}$ of the second energy storage device 32 based on the second required electricity $I_L$ of the second energy storage device 32, the load electricity $V_0$, the voltage $V_1$ of DC bus 20, the voltage $V_2$ of the first energy storage device 31, the voltage $I_{1N}$ of the second energy storage device 32 and the rated electricity $I_{2S}$ of the first energy storage device 31.

Energy management control method according to a specific execution mode of this invention further comprises: Converter controller 70 controls DC-DC converter 10 based on the received first set electricity $I_{1S}$ is of the first energy storage device 31, the second set electricity $I_{1S}$ of the second energy storage device 32, the first electricity $I_1$ of the first energy storage device 31 and the second electricity $I_2$ of the second energy storage device 32.

Energy management control method in this invention can control the power distribution ratio between the first energy storage device 31 and the second energy storage device 32 based on the operation conditions of electrical machine 50, vehicle and load to satisfy the vehicle power requirements of the vehicle propulsion system 100, while making the vehicle propulsion system 100 be better able to work in a variety of driving conditions, such as starting, acceleration, cruising, braking and parking, and the vehicle propulsion system 100 of embodiments of this invention to have higher efficiency and better robustness.

While the combination of certain specific execution modes of this invention has been described in detail, technicians of this field will appreciate understand that this invention may be made with many modifications and variations. Therefore, the intention of the claims is to cover these modifications and variations of the true spirit and scope of this invention.

What is claimed is:

1. A vehicle propulsion system of a vehicle, comprising:
   an energy dense energy storage device coupled to a first DC-DC converter;
   a power dense energy storage device coupled to a second DC-DC converter;
   a DC link coupled to the first and second DC-DC converters;
   an inverter coupled to the DC link;
   a motor coupled to the inverter; and an energy management control system that generates a power split ratio between the energy dense energy storage device and the power dense energy storage device, the energy management control system comprising:
  a first control system that generates a first scheduled current of the energy dense energy storage device based on a torque and speed of the motor; and
  a second control system that generates a second scheduled current of the power dense energy storage device based on a scheduled voltage of the power dense energy storage device and a voltage of the power dense energy storage device, the scheduled voltage of the power dense energy storage device being based on an operating mode and speed of the vehicle; and
  a converter controller that controls the first and second DC-DC converters based on the first scheduled current and the second scheduled current.

2. The vehicle propulsion system of claim 1, wherein the first control system generates the first scheduled current based further on a voltage of the DC link and a voltage of the energy dense energy storage device.

3. The vehicle propulsion system of claim 2, wherein the first control system comprises:
  a first scheduler that generates a scheduled voltage of the DC link based on the torque and the speed of the motor; and
  a first controller that generates the first scheduled current based on the scheduled voltage of the DC link, the voltage of the DC link, and the voltage of the energy dense energy storage device.

4. The vehicle propulsion system of claim 1, wherein the second control system generates the second scheduled current based further on a voltage of the DC link, a voltage of the energy dense energy storage device, and a voltage of the power dense energy storage device.

5. The vehicle propulsion system of claim 4, wherein the second control system comprises:
  a second scheduler that generates the scheduled voltage of the power dense energy storage device; and
  a second controller that generates the second scheduled current.

6. The vehicle propulsion system of claim 5, wherein when the vehicle operates in a cruise mode, the second scheduler generates the scheduled voltage of the power dense energy storage device based on a current cruise speed of the vehicle by a combination of energy required in the power dense energy storage device for acceleration of the vehicle and energy required to store in the power dense energy storage device for regenerative braking of the vehicle.

7. The vehicle propulsion system of claim 5, wherein when the vehicle operates in a start or accelerate mode, the second scheduler converts an original speed signal of the vehicle to a scheduled speed of the vehicle and generates the scheduled voltage of the power dense energy storage device based on the converted scheduled speed of the vehicle.

8. The vehicle propulsion system of claim 5, wherein when the vehicle operates in a brake mode, the scheduled voltage of the power dense energy storage device is scheduled to a constant value.

9. The vehicle propulsion system of claim 1, wherein the energy dense energy storage device comprises an energy battery with high energy density, and the power dense energy storage device comprises a power battery with high power density or an ultracapacitor.

10. An energy management control method for a vehicle propulsion system of a vehicle, the vehicle propulsion system including an energy dense energy storage device coupled to a first DC-DC converter, a power dense energy storage device coupled to a second DC-DC converter, a DC link coupled to the first and second DC-DC converters, an inverter coupled to the DC link, and a motor coupled to the inverter, the control method comprising:
  obtaining a torque and speed of the motor to generate a first scheduled current of the energy dense energy storage device;
  obtaining an operating mode and a speed of the vehicle to generate a scheduled voltage of the power dense energy storage device;
  generating a second scheduled current of the power dense energy storage device based on the scheduled voltage of the power dense energy storage device and a voltage of the power dense energy storage device; and
  generating a power split ratio between the energy dense energy storage device and the power dense energy storage device by controlling the first and second DC-DC converters based on the first scheduled current and the second scheduled current.

11. The control method of claim 10, further comprising:
  obtaining a voltage of the DC link and a voltage of the energy dense energy storage device; and
  generating the first scheduled current based on the torque and speed of the motor, the voltage of the DC link, and the voltage of the energy dense energy storage device.

12. The control method of claim 11, further comprising:
  generating a scheduled voltage of the DC link based on the torque and the speed of the motor; and
  generating the first scheduled current based on the scheduled voltage of the DC link, the voltage of the DC link, and the voltage of the energy dense energy storage device.

13. The control method of claim 10, further comprising:
  obtaining a voltage of the DC link, a voltage of the energy dense energy storage device, and a voltage of the power dense energy storage device; and
  generating the second scheduled current of based on the required current of the power dense energy storage device, the current input to the inverter, the voltage of the DC link, the voltage of the energy dense energy storage device, and the voltage of the power dense energy storage device.

14. The control method of claim 13, wherein when the vehicle operates in a cruise mode, the method comprises:
  calculating energy required in the power dense energy storage device for acceleration of the vehicle;
  calculating energy required to store in the power dense energy storage device for regenerative braking of the vehicle; and
  generating the scheduled voltage of the power dense energy storage device based on a combination of the two energies.

15. The control method of claim 14, further comprising:
  calculating energy required in the power dense energy storage device for the vehicle accelerating to a maximum speed with a current cruise speed;
  calculating energy required to store in the power dense energy storage device for the vehicle decelerating to a minimum speed with the current cruise speed; and
  combining the calculated two energies.

16. The control method of claim 13, wherein when the vehicle operates in a start or accelerate mode, the method comprises:

converting an original speed signal of the vehicle to a scheduled speed of the vehicle; and generating the scheduled voltage of the power dense energy storage device based on the converted scheduled speed of the vehicle.

17. The control method of claim 13, wherein when the vehicle operates in a brake mode, the method comprises:

scheduling the scheduled voltage of the power dense energy storage device to a constant value.

18. A vehicle propulsion system of a vehicle, comprising:

an energy dense energy storage device coupled to a first DC-DC converter;

a power dense energy storage device coupled to a second DC-DC converter;

a DC link coupled to the first and second DC-DC converters;

an inverter coupled to the DC link;

a motor coupled to the inverter; and an energy management control system that generates a power split ratio between the energy dense energy storage device and the power dense energy storage device by:

generating a first scheduled current of the energy dense energy storage device based on a torque and speed of the motor;

generating a second scheduled current of the power dense energy storage device based on a scheduled voltage of the power dense energy storage device and a voltage of the power dense energy storage device, the scheduled voltage of the power dense energy storage device being based on an operating mode and speed of the vehicle; and controlling the first and second DC-DC converters based on the first scheduled current and the second scheduled current.

* * * * *